Sept. 6, 1927.

W. C. PITTER 1,641,902

TRANSMISSION GEARING

Filed July 3, 1922

W. C. PITTER 1,641,902

TRANSMISSION GEARING

Filed July 3, 1922

Sept. 6, 1927.  
W. C. PITTER  
1,641,902  
TRANSMISSION GEARING  
Filed July 3, 1922  
7 Sheets-Sheet 4

Sept. 6, 1927.   W. C. PITTER   1,641,902
TRANSMISSION GEARING
Filed July 3, 1922   7 Sheets-Sheet 5

Sept. 6, 1927.
W. C. PITTER
1,641,902

TRANSMISSION GEARING

Filed July 3, 1922
7 Sheets-Sheet 6

W. C. PITTER

TRANSMISSION GEARING

Filed July 3, 1922

Patented Sept. 6, 1927.

1,641,902

UNITED STATES PATENT OFFICE.

WALTER CHARLES PITTER, OF ELTHAM, ENGLAND, ASSIGNOR TO ALBERT EDWARD OSBORNE.

TRANSMISSION GEARING.

Application filed July 3, 1922, Serial No. 572,569, and in Great Britain July 19, 1921.

This invention relates to transmission gear particularly applicable as a variable speed gear, and has for its object to provide a compact, strong and efficient gear of inexpensive construction, and one in which friction losses are reduced to a minimum.

The invention comprises a transmission gear comprising a member such as an eccentric mounted on or driven by a power driven shaft and adapted to communicate motion to a power transmission member, wherein such motion is communicated by the relative movement to or from each other, of the two ends of each of a series of levers, each lever having a pivoted and a free end and consisting of portions hinged together at their adjacent ends, the pivoted end of each lever being connected to either a fixed member or the power transmission member and means provided whereby the eccentric member operates to transmit lateral motion to the hinge of the hinged portion of each lever in succession in such a manner as to produce the relative movement between the two ends of the lever.

The eccentric is preferably surrounded by a ring mounted on a ball bearing and adapted to communicate the radial motion to the levers.

Various embodiments of the invention are illustrated in the accompanying drawings, wherein—

Figure 19 is an elevation of a detail of a modification of the lever mechanism using toothed ratchet transmitting devices.

Figure 1:
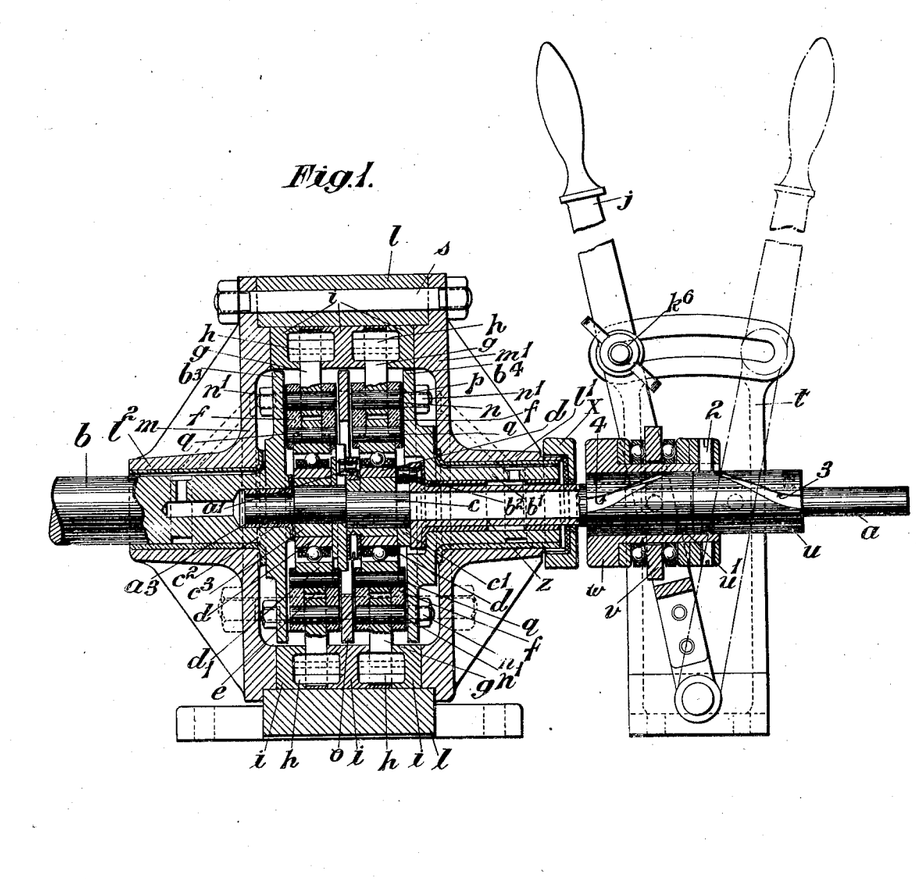
Figure 1 is a longitudinal section of a transmission gear provided with means for varying the stroke of the eccentric or power member.
Figure 2:
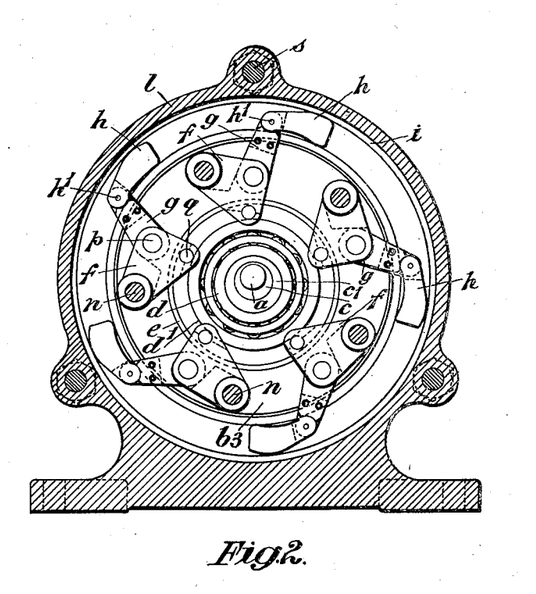
Figure 2 is a transverse section of Figure 1.

In the transmission gear shown in Figures 1 and 2, $a$ is a power driven shaft constructed with two oppositely disposed eccentrics $c$, $c^2$, and on these eccentrics are rotatively mounted two other eccentrics $c^1$, $c^3$, to provide means for varying the operative throw of the eccentric members. The eccentric $c^1$ is adapted to be rotated relatively to its inner eccentric $c$ by a pin $b^2$ working in a radial slot in the face of the eccentric $c^1$ and mounted on the end of a sleeze Z. Rotary motion is transmitted from the eccentric $c^1$ to the eccentric $c^3$ by a pin $a^1$ mounted on the eccentric $c^1$ and operating in a radial slot in the adjacent face of the eccentric $c^3$.

The sleeve Z is rotated relatively to the shaft $a$ by means of a sleeve divided into two portions $u$, $u^1$, the portion $u$ being fixed to the shaft $a$ while the portion $u^1$ is fixed to the sleeve Z. These portions are rotated relatively to one another by a pin 2 working in a helical groove 3 in $u$ and a corresponding pin not shown in the drawings arranged to operate in an oppositely inclined helical groove 4 in $u^1$. Both of these pins are fixed in a sleeve $w$ adapted to be moved axially by a ball bearing collar $v$ connected to a hand lever $j$ pivoted on the bracket $t$ and which may be fixed in any adjusted position by a bolt $k^6$ operating in an arcuate slot in the bracket $t$.

On each of the outer eccentrics $c^1$ and $c^3$ is rotatively mounted on a ball bearing $d$ a rotary member or ring $d^1$ on which are adapted to rest radially movable members or pins $q$ which are held thereon by means of an outer ring $e$. Each of the levers operated by these eccentrics is formed of two portions $f$ and $g$ hinged together at their adjacent ends by a pin $p$. The portion $f$ of each operating lever is pivoted by a pin $n$ to a flange $b^3$ formed on the end of a power transmitting shaft $b$ in the end of which the inner end $a^3$ of the shaft $a$ rotates. A flange $b^4$ corresponding to the flange $b^3$ and provided with a bearing sleeve $b^1$ is provided at the opposite side of the eccentrics and these two flanges are connected together by the pins $n$ on which they are fixed by the nuts $n^1$. These pins also pass through a central dividing ring $o$. X is a cap nut screwed or fitted on the end of the bearing $l^1$ for the sleeve $b^1$ and which is provided on the end casting $m^1$ of the standard or casing $l$ of the transmission gear. On the other end of this casing is arranged a corresponding end casting $m$ provided with a bearing $l^2$ for the shaft $b$. The end castings $m$ and $m^1$ are bolted together and to the standard $l$ by means of bolts $s$. The portions $f$ of the levers pivoted by pins $n$ to the flanges $b^3$ of the shaft $b$ are provided with a portion projecting inwardly from the pin $p$ and forming cheeks in which are secured the ends of the pins $q$ so that a movement radially of the pin $q$ by its co-operating eccentric will turn the portion $f$ of the lever about its pivot $n$ and so alternately straighten out and bend the two hinged portions $f$ and $g$ of the lever, and thereby also produce relative movements alternately to and from each other of the opposite ends of the lever. The free end of the outer hinged portion $g$ of the lever consists of a member $h$ hinged to the member $g$ at $h^1$ and of which the end portion is in the form of a locking shoe adapted to operate in an annular groove formed in the face of a fixed ring $i$ secured to the standard $l$. Opposite pairs of such grooves are provided by arranging in the casing a central ring $i$ having face grooves on opposite sides, another ring $i$ is also provided for the opposite side of the casing, so that lateral projections or locking shoes on the members $h$ for the set of levers for each eccentric will extend into the said grooves. These laterally extending portions or locking shoes are so constructed that when the hinged portion $h$ is moved angularly by the movement of the hinged member $g$ of the lever when operated by the eccentric by its movement of the pin $q$, they will grip the sides of the groove when moved in one direction and be released therefrom when moved in the opposite direction. It will be readily understood that during such gripping period further radial movement of the pin $p$ by the eccentric will tend to straighten out the lever and so cause the pin $n$ to force round the flange $b^3$ and consequently the shaft $b$. There are five of these hinged levers arranged at equal distances circumferentially on the flange $b^3$, and the action takes place with each of them in succession. Any suitable number of hinged levers may be provided. It will also be understood that the ratio of the speed of the shaft $a$ to that of $b$ can be varied by varying the stroke of the adjustable eccentrics by means of the hand lever $j$.

The transmission gear described with reference to Figures 1 and 2 is provided with means for adjusting the strokes of the levers, a simplified form of the device, may however, be designed without stroke adjustment by dispensing with the eccentrics $c^1$ and $c^3$ and their hand lever adjusting mechanism $j$. Also a further simplification may be effected by providing only one eccentric and set of lever mechanism.

The action of the eccentric on the hinged levers being a radial one, in the ordinary construction of the gear the shaft $b$ will be driven in one direction even if the direction of the power shaft $a$ is reversed.

Figure 3:
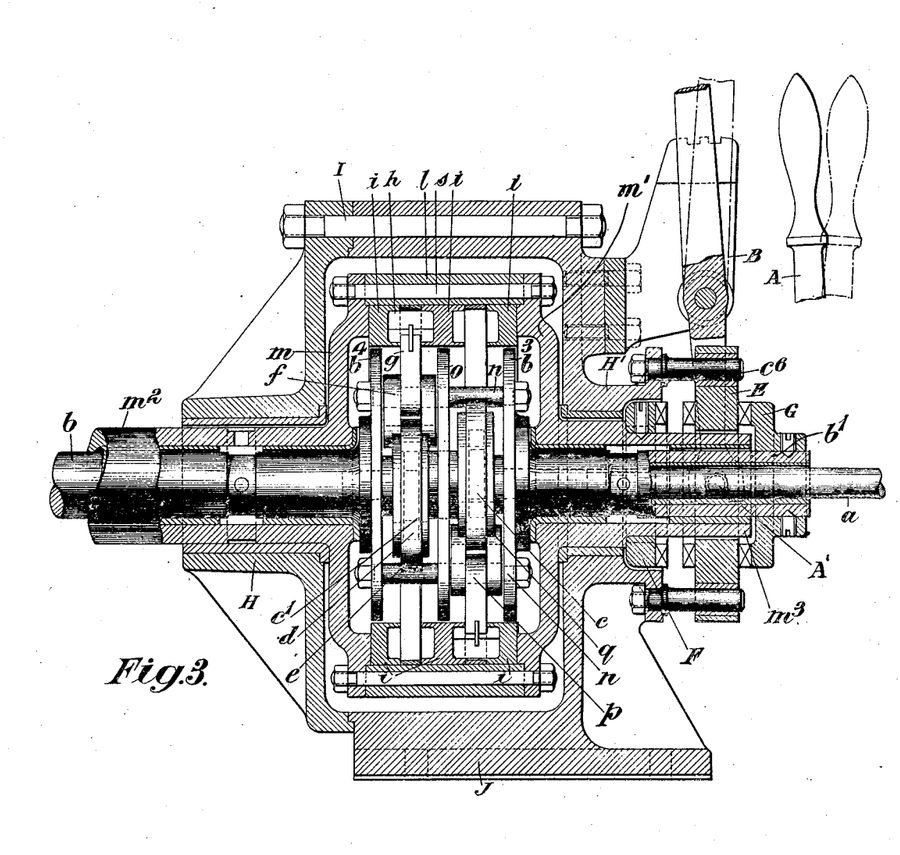
Figure 3 is a longitudinal section of a modification of the gear arranged for both forward and reverse drives.

Figure 3 is a longitudinal sectional view of a transmission gear provided with means for reversing the direction of the drive. The lever and eccentric mechanism is similar to that described with reference to Figures 1 and 2, the stroke varying mechanism being dispensed with. The eccentrics $c$, $c^1$ are formed on the shaft $a$ and move the hinged portions $f$ and $g$ of the levers in such a manner as to operate the shoe pieces of the lever $h$ in the face grooves in the rings $i$. These rings are secured to a casing $l$ having end flanges $m$ and $m^1$. The flange $m$ being formed on a hollow power transmission shaft $m^2$ rotating in a bearing H on the end of the main casing J, while the flange $m^1$ is formed on a hollow shaft $m^3$ rotating in a bearing $H^1$ on the opposite end of the casing J. The power transmission shaft $b$ rotates within the hollow shaft $m^2$ and is connected to the flanges $b^3$ and $b^4$ carrying the lever pivot pins $n$, the flange $b^3$ being formed on a hollow shaft $b^1$ rotating within the hollow shaft $m^3$.

It will be readily understood that when the shaft $m^3$ is prevented from rotating, the rotation of the power driven shaft $a$ will through the eccentric and lever mechanism drive the shaft $b$ in one direction. It will also be understood that when the shaft $b^1$ is prevented from rotating, the rotation of the power shaft $a$ will through the eccentric and lever mechanism drive the shaft $m^2$ in the opposite direction.

The locking of either the shaft $b^1$ or the shaft $m^3$ is effected by means of a claw clutch E slidable longitudinally on guide pins $c^6$ by means of a hand lever A pivoted on the bracket B and forked at its end to engage pins $A^1$ on the clutch E, in the usual manner of operating such clutches. The clutch E is provided on one side with claw teeth adapted to engage when moved to the right corresponding claw teeth formed on a clutch member G secured to the shaft $b^1$, and the clutch E is provided on the opposite side with claw teeth adapted to engage when moved to the left corresponding claw teeth formed on a clutch member F secured to the shaft $m^3$, such movement of the clutch E being arranged to declutch one member before engaging the opposite member, in the usual manner.

The power transmission shafts $b$ and $m^2$ may be geared in any suitable manner to the machine to be driven, clutch mechanism being provided whereby either one of them may be brought into operation.

Figures 4, 5, 7:
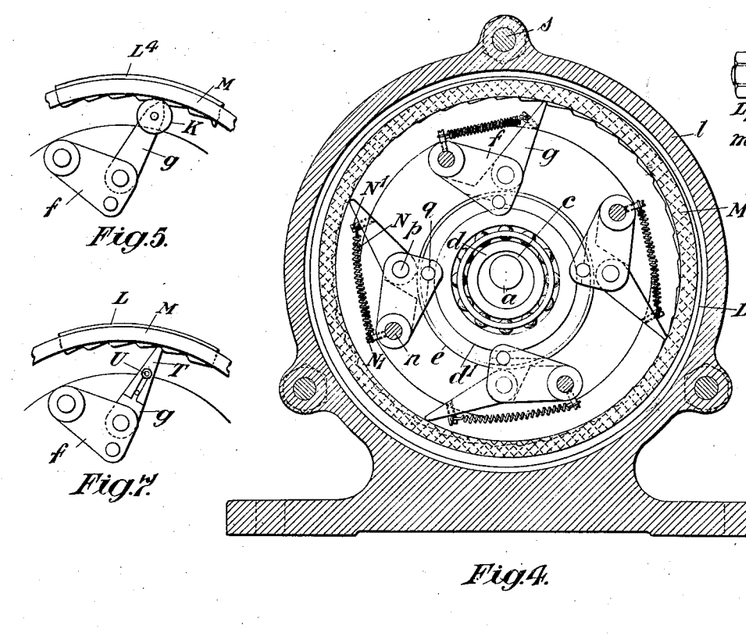
Figure 4 is a transverse section of the gear using toothed ratchet mechanism.
Figures 5, 6 and 7 are details used in Figure 4.
Figure 6:
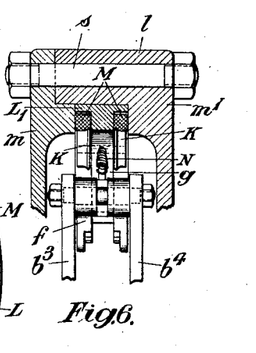

An embodiment of the invention using toothed rack gear is illustrated as a sectional view in Figure 4 and a partial transverse sectional view in Figure 6. The pins $q$ are moved radially by an eccentric $c$ and are arranged between rings $d^1$ and $e$ as in the previous example shown in Figures 1 and 2.

The free end of the portion $g$ of the hinged lever is adapted to engage the internal teeth of a ring $L^1$ which is connected to the casing $m$ and $m^1$, its function being similar to that of the rings $i$, $i$ in Figures 1 and 2. The ring $L^1$ is recessed at each side for the reception of floating rings M, M in which roll rollers K, K rotatively mounted at each side of the tooth engaging end of the portion $g$ of the hinged operating lever. These rings M, M by engaging the rollers K, K keep the tooth engaging ends of the levers free of the teeth during their inoperative period, which is arranged to take place when the angle of inclination of the hinged portion $g$ of the lever to the rings M, M is that into which the levers would have to be lifted to raise their points out of the teeth in the ring $L^1$ by the tilting action of the levers about the rollers K, K as pivots. In Figure 4 the rollers K, K are omitted the free ends of the levers $g$ being made wide enough to rest on the inside of the floating rings M, M when in the inoperative position. The portions $f$ and $g$ of the hinged levers which are hinged together by the pins $p$, are also connected together by a spring N of which the ends are secured by pins $N^1$. These springs are arranged to pull the hinged portions $f$ and $g$ into their contracted positions, the limit of which is fixed by the engagement of the portion $g$ with the forked portion of $f$ in the prongs of which is fixed the hinge pin $q$. The floating rings are of such a size as to hold the operating tooth of a lever on one side of the ring out of engagement with the rack teeth while the tooth of a diametrically opposite lever is in engagement with the rack teeth.

Means are provided for taking up wear of the operating point of the lever. For this purpose as shown in Figure 7, the point T of the lever $g$ may be mounted thereon in such a manner as to be slidable longitudinally and be fixed in the adjusted position by means of a nut and screw U.

The operation of the lever and eccentric mechanism is similar to that described with reference to Figures 1 and 2, the power being transmitted through the flanges $b^3$ and $b^4$ to the power transmission member connected thereto.

Figures 8, 9:
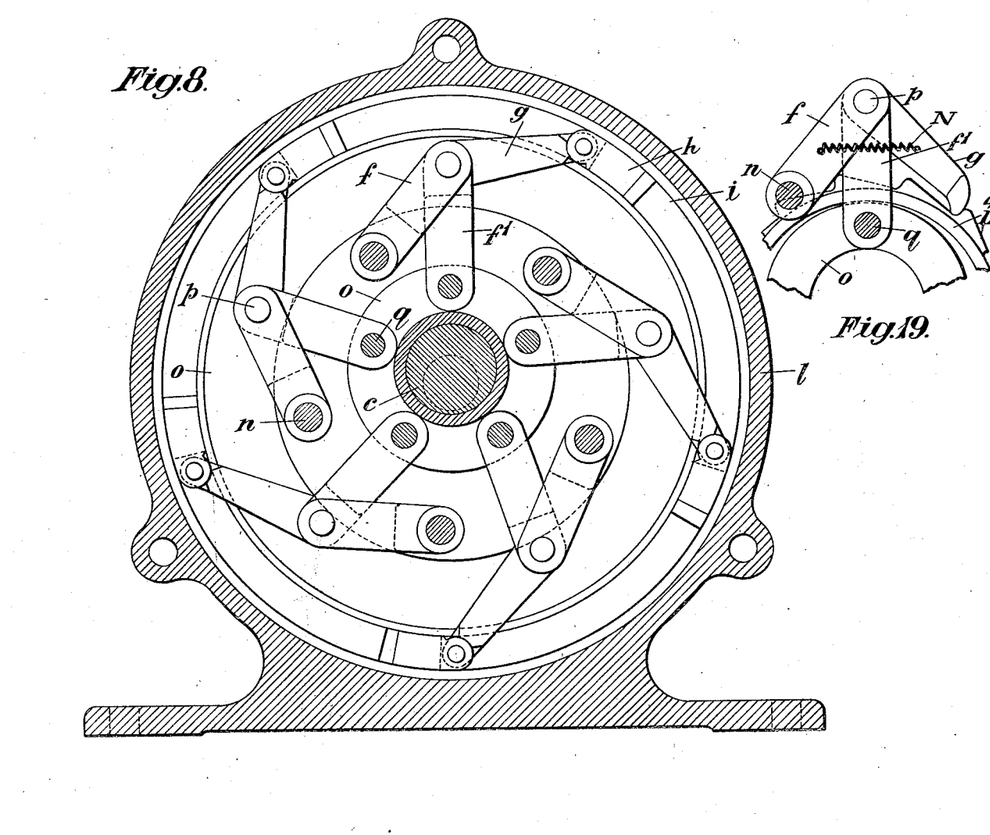
Figure 8 is a transverse section of the gear showing a modification in the link or lever details.
Figures 9 and 10 are respectively side and end views of a detail of the engaging end of an operating lever.
Figure 9:
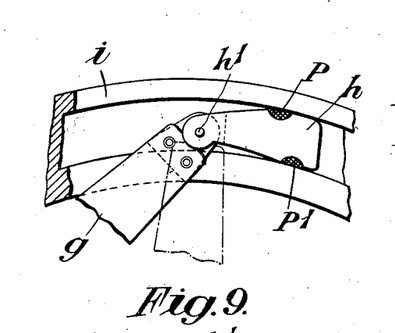

In the modification of the transmission gear as shown in Figure 8, the pin $q$ instead of being mounted in an extension of the pivoted portion $f$ of the lever, is mounted in the end of a link $f^1$ pivoted at its other end to the hinge pin $p$ connecting the portions $f$ and $g$ of the lever together. The ends of the links $f^1$, $f^1$ are pivoted by the pins $q$ to a floating ring O surrounding the eccentric $c$. In applying this modification of the gear to levers having plain surface gripping members or shoes, these may be of the kind illustrated by Figures 9 to 18. Instead of such gripping devices the rack mechanism shown in Figure 19 may however, be used.

Figure 10:
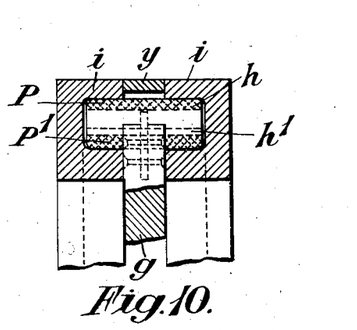

The end of the locking shoe member $h$ as illustrated in Figures 9 and 10 is provided with bearing pieces P, $P^1$ having semicircular backs fitting in corresponding recesses formed in the member $h$ so that the member $h$ is free to partake of a slight rocking movement on the pieces P, $P^1$ when operated by the lever $g$. These pieces are not arranged opposite to one another but sufficiently out of alignment to cause their engaging surfaces to be forced into gripping contact with the sides of the groove in the ring $i$ when the lever $g$ operating on the member $h$ moves them towards alignment and thus effect the necessary shoe gripping action to ensure the driving of the transmission member operated by the other end of the lever.

Figures 11, 12, 17, 18:
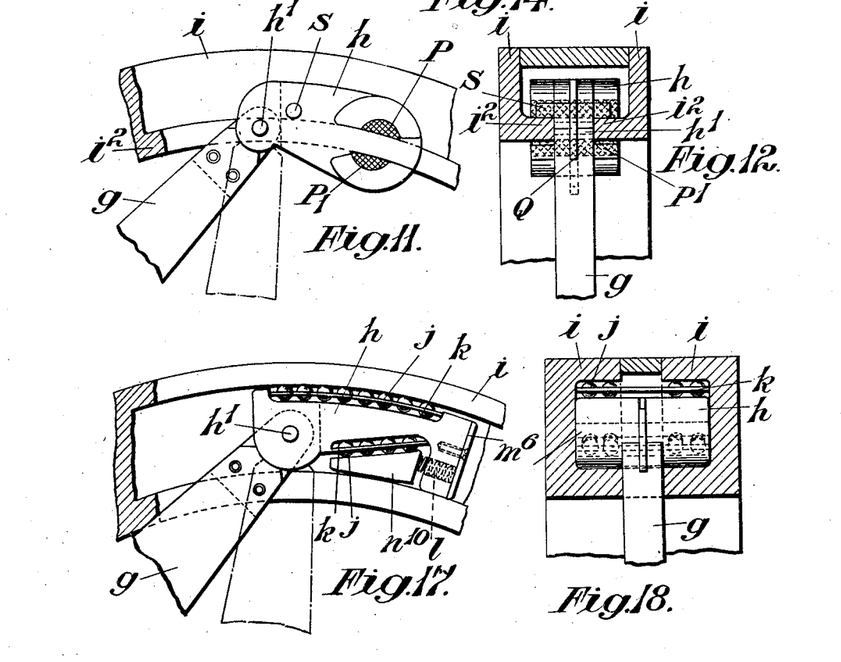
Figures 11 and 12 are corresponding views to Figures 9 and 10 of a further modification of the engaging end of an operating lever.
Figures 17 and 18 are respectively side and end views of a further modification of the engaging end of an operating lever.

The locking shoe member illustrated by Figures 11 and 12 is designed to exert an inward gripping action instead of an outward one as in the previous example. This inward gripping action is effected by providing the ring $i$ with a flange $i^2$ in the place of the annular groove, and the shoe members of $h$ with a groove to fit over this flange. On opposite sides of the flange are arranged bearing pieces P, $P^1$, fitting in semicircular recesses in the opposite sides of the groove in the shoe member and arranged out of alignment as in the previous example. The member $h$ is provided with a guide pin S adapted to engage the flange $i^2$. The operation of this gripping member which has been found to be very effective in practice, is by the tilting action of the member $h$ by the end $g$ of the operating lever as in the previous examples.

The engaging surfaces of the gripping shoes may be of the spring pressed sliding wedge type or ball type, the wedges being provided with one or more operating surfaces consisting of a number of balls held in uniform distribution over the surface. Three examples of this type of shoe are illustrated by Figures 13 to 18.

Figure 13:
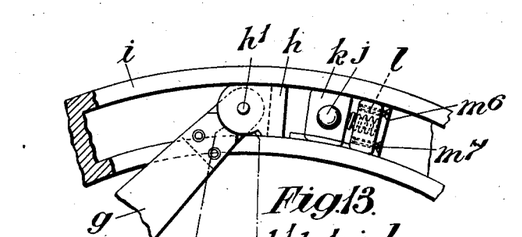
Figures 13 and 14, and 15 and 16 are respectively side elevations and plans of two further modifications of the engaging end of an operating lever.
Figure 14:
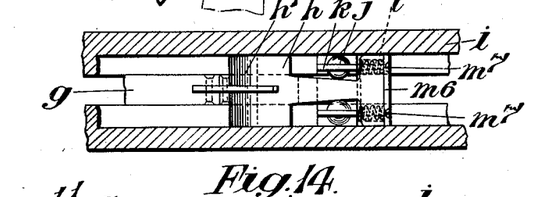

In Figures 13 and 14 the gripping pressure of the shoe member $h$ in the ring members $i, i$ is exerted laterally against opposite rings by means of balls $j, j$ when the shoe member $h$ is pushed towards the balls, by arranging the balls in recesses in opposite sides of the shoe member $h$. The base of these recesses is inclined to form a wedge-like member which is driven by the operation of the hinged levers, between the two balls $j, j$ and so forces them laterally outwards into gripping contact with the bases of grooves in a pair of oppositely disposed rings $i, i$. The balls $j, j$ are held in cage-like members $k$ pressed towards engaging position by means of springs $l, l$ which are held in holes in the end of the shoe member, by means of plate $m^6$ held on the said members by screws $m^7$.

Figure 15:
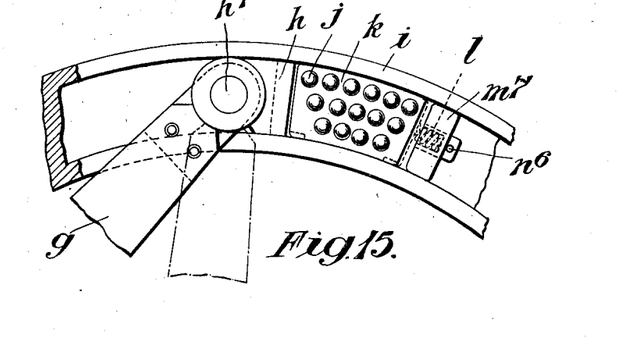
Figure 16:
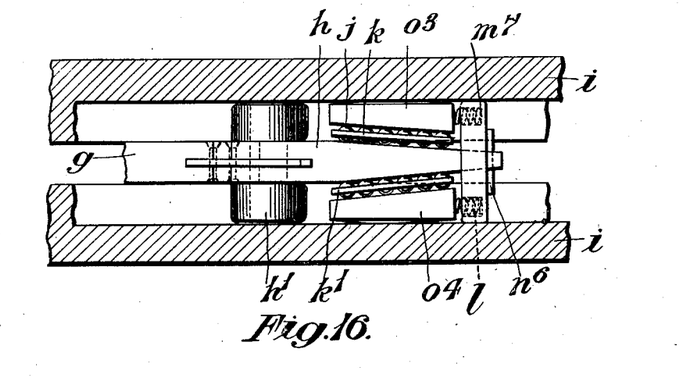

Figures 15 and 16 illustrate a modification of the shoe shown in Figures 13 and 14. In this example the end of the shoe member $h$ is wedge shaped as shown in plan in Figure 16. On the opposite sides of this wedge are arranged two other wedges $o^3$ and $o^4$ the outer surfaces of which are gripping surfaces adapted to be driven into contact with the opposite rings $i, i$. Between these wedges and the wedge-shaped end of the member $h$ are arranged series of balls held in uniform distribution over the surfaces by means of the cages $k, k$. The wedges $o^3$ and $o^4$ are held in position by means of springs $l, l$ arranged to bear in holes in a transversely arranged plate $m^7$, the central portion of which is provided with a hole adapted to fit over the point of the wedge end of $h$, the plate $m^7$ being held thereon by a pin $n^6$.

In a further example of this type of shoe grip as shown in Figures 17 and 18, a series of balls $j$ held in a cage member $k$ are arranged on the outer surface of the shoe and form the gripping surface for one side of an annular groove in a ring $i$. The gripping surface for the opposite side of the groove is the outer slightly curved surface of a wedge $n^{10}$ of which the inner surface is separated from an inclined face on the member $h$ by means of a series of balls $j, j$ arranged in a cage $k$. The wedge $n^{10}$ is held in place by a spring $l$ secured in a hole in a transverse end piece of $h$ by means of a plate $m^6$ held thereon by screws.

The lever mechanism illustrated by Figure 19 is a modification of that illustrated by Figure 8. In this example the rack teeth are formed on a ring $L^4$, the teeth being on the outer periphery of the ring instead of on the inside thereof as in Figure 4, and the end of the portion $g$ of the operating lever is provided with a tooth shaped to engage the teeth in the ring $L^4$. This rack engaging tooth on the portion $g$ of the lever may be made adjustable laterally. As in Figure 8 the ring $o$ is operated by the eccentric on which it is mounted and transmits motion to the lever mechanism through the link $f^1$, a spring N being provided to keep the toothed end of $g$ in engagement with the teeth in the ring $L^4$ in the usual manner.

What I claim and desire to secure by Letters Patent is:—

1. A power transmission gear comprising in combination, a power driven eccentric, a plurality of pairs of toggle links loosely resting on the eccentric and each pair having a ratchet pawl at one end and a pivot at the other, a rotary power transmission member, a rotary member, a radially movable ratchet operating member, and a fixed member, the toggle links extending in opposite directions from their toggle pin and from their radially movable member to which they are operatively connected, the radially movable member being carried by the rotary member and by which it is operatively connected to the power driven eccentric, and one end of toggle links associated with the fixed member while the other end is associated with the power transmission member so that the power transmission member will be moved by the resultant action of the ratchet pawl as operated by the toggle link from the power eccentric.

2. A power transmission gear comprising a fixed member provided with a circumferential groove, a rotary power transmission member, a rotary member carrying radially movable pins, a power driven eccentric, a plurality of pairs of toggle links each pair having a ratchet pawl pivoted at one end and adapted when moved in transmitting direction to grip opposite sides of said groove formed in the fixed member, the other end of each pair of toggle links being pivoted to the rotary power transmission member, the toggle links of each pair extending in opposite directions from their toggle pin which is moved radially outward and inwards by means of one of the pins mounted in the rotary member surrounding and receiving radial motion from the power eccentric.

3. A power transmission gear comprising a fixed member provided with a circumferential groove, a rotary power transmission member, a rotary member carrying radially movable pins each pivoted to an extension of one of the toggle links extending towards the eccentric, a power driven eccentric, a plurality of pairs of toggle links each pair having a ratchet pawl pivoted at one end and adapted when moved in transmitting direction to grip opposite sides of the groove formed in the fixed member, the other end of each pair of toggle links being pivoted to the rotary power transmission member, the toggle links of each pair extending in opposite directions from their toggle pin which is moved radially outwards and inwards by means of one of the pins mounted in the rotary member surrounding and receiving radial motion from the power eccentric.

4. A power transmission gear comprising in combination, a variable throw power driven eccentric, a plurality of pairs of toggle links on the outer surface of said eccentric, each pair having a ratchet pawl at one end and a pivot at the other, a rotary power transmission member, a rotary member, a radially movable ratchet operating member, and a fixed member, the toggle links extending in opposite directions from their toggle pin and from their radially movable member to which they are operatively connected, the radially movable member being carried by the rotary member and by which it is operatively connected to the power driven eccentric, and one end of the toggle links associated with the fixed member while the other end is associated with the power transmission member so that the power transmission member will be moved by the resultant action of the ratchet pawl as operated by the toggle link from the power eccentric.

5. A power transmission member comprising in combination, two oppositely disposed power driven eccentrics mounted on a common shaft, a plurality of pairs of toggle links arranged in two sets one associated with each eccentric and each pair of toggle links having a ratchet pawl at one end and a pivot at the other, a rotary power transmission member, two rotary members, radially movable ratchet operating members, and a fixed member, the toggle links of each set extending in opposite directions from their toggle pin and from one of the radially movable members to which they are operatively connected, the radially movable members of one set being carried by one of the rotary members and by which it is operatively connected to one of the power driven eccentrics, and one end of the toggle links associated with the fixed member while the other end is associated with the power transmission member so that the power transmission member will be moved by the resultant action of the ratchet pawl as operated by the toggle link from the power eccentrics.

6. A transmission gearing comprising a driving shaft, a driven shaft, a fixed member, a plurality of pairs of levers, one lever in each pair being attached to the driven shaft and being pivotally connected to the other lever of the pair, means for moving in each pair that lever radially relatively to the driving shaft which is attached to the driven shaft, and means at the end of the other lever of each pair for bracingly engaging the fixed member.

7. A transmission gearing comprising a driving shaft, a driven shaft, a fixed member, a plurality of pairs of levers, one lever in each pair being pivotally connected with the companion lever of the pair, an eccentric on the driving shaft, one of the levers in each pair being actuated through the eccentric to move radially with respect to the driving shaft, the same lever being pivotally connected with the driven member, and means at the end of the other lever in each pair for pushingly engaging the fixed member.

8. A transmission gearing comprising a driving shaft, a driven shaft, a fixed annular member, a plurality of sets of levers, one lever in each set being pivotally connected with the companion lever of the set, means for moving a lever in each set radially with respect to the driving shaft, the same lever in each set being pivotally connected with the driven shaft, and means at the end of the other lever in each set for engaging the annular fixed member on opposite surfaces.

9. A transmission gearing comprising a driving shaft, a driven shaft, a grooved ring, a plurality of sets of levers, the levers in each set being pivotally connected with each other, means for moving one lever in each set radially with respect to the driving shaft, this lever being associated with the driven shaft, and means at the end of another lever in each set for bracingly engaging the grooved ring.

10. A transmission gearing comprising a driving shaft, a driven shaft, a fixed member, a plurality of toggle joints, each comprising two pivotally interconnected levers, means for imparting radial movement with respect to the driving shaft to one lever in each toggle joint, means at the end of the other lever of the toggle joints for engaging the fixed member, and means for pivotally connecting the first named lever with a fixed point of the driven member.

11. A transmission gearing comprising a driving shaft, a driven shaft, a grooved ring concentric with the driving shaft and fixed against movement, a plurality of toggle joints, each joint comprising two levers in pivotal connection with each other, means for moving a lever in each joint radially with respect to the driving shaft, said lever being attached to the driven shaft, and means on the other lever of each toggle joint for engaging walls of the grooved ring from opposite sides.

12. A transmission gearing comprising a driving shaft, a driven shaft, a fixed circular member concentric with the shafts, a plurality of pairs of levers, a lever in each pair being pivotally connected with the companion lever of the pair, an eccentric on said driving shaft exerting a pushing action on one lever of each pair, a pivotal connecting element between said first named lever and the driven shaft, and a locking shoe on the second lever of each pair for engaging the fixed member on opposite surfaces.

13. A transmission gearing comprising a driving shaft, a driven shaft in alinement therewith, a grooved ring concentric with said shafts, an eccentric on the driving shaft, a plurality of pairs of levers, a lever in each pair having a pin near one end, a ring surrounding the eccentric, ball bearings between the eccentric and said ring, the pin of the lever in each pair resting on the circumference of said ring, a pivot pin extending from the same lever into the driving shaft, and a locking shoe on the other lever of each pair in engagement with opposite surfaces of the grooved ring concentric with the shafts.

14. A transmission gearing comprising a driving shaft, a driven shaft, a fixed circular member concentric with the shafts, an eccentric on the driving shaft, a plurality of pairs of levers, each pair having a lever provided with a pin near one end and adapted to be pushed radially in respect of the driving shaft through said eccentric, a pivotal connecting element between the same lever in each pair and the driven shaft, and a locking shoe associated with the end of the other lever in each pair, said locking shoe having wear pieces in engagement with opposite surfaces of the fixed circular member.

15. A transmission gearing comprising a driving shaft, a driven shaft in alinement therewith, a fixed grooved ring, an eccentric on the driving shaft, a plurality of pairs of levers, means supported by the eccentric for exerting a pushing action on a lever in each pair radially with respect to the driving shaft, said lever being pivotally connected with the driven shaft, a friction shoe on the companion lever in each pair adapted to engage the fixed grooved ring on opposite sides, and wear absorbing elements inserted in said friction shoe so as to be movable therein.

16. A transmission gearing comprising a driving shaft, a driven shaft in alinement therewith, a fixed grooved ring, an eccentric on the driving shaft, a ring loosely surrounding said eccentric, a plurality of pairs of levers, the ring on the eccentric being adapted to successively exert a pushing action on one lever in each pair radially with respect to the driving shaft, said lever in each pair being pivotally connected with the driven shaft, and a locking shoe associated with the companion lever in each pair adapted to frictionally engage the fixed grooved ring on opposite sides, locking elements of approximately semi-circular cross-section being loosely carried by said locking shoe and adapted for engagement with the fixed grooved ring on opposite sides thereof.

17. A transmission gearing comprising a driving shaft, a driven shaft in alinement therewith, a fixed grooved ring, an eccentric on the driving shaft, a ring loosely surrounding said eccentric and supported thereby, a plurality of pairs of levers, said loose eccentric ring being adapted to exert a pushing action on one lever in each pair radially will respect to the driving shaft, said lever being pivotally connected with the driven shaft, means associated with the companion lever in each pair for frictionally engaging the fixed grooved ring, and wear absorbing elements loosely inserted in said last named means adapted for engaging the fixed grooved ring, said wear absorbing elements being radially offset with respect to each other in each of said means.

18. A transmission gearing comprising a driving shaft, a driven shaft, a fixed member, a plurality of sets of actuating elements, each set having an element pivotally connected with the companion element of the same set, one element in each set being pivotally connected with the driven shaft, means controlled by the driving shaft for moving the same element in each set radially relatively to the driving shaft, means on another element of each set for successively engaging the fixed member at different points, and means surrounding the driving shaft for angularly varying the position of the driving shaft with respect to the means for moving an element in each set radially relatively to the driving shaft.

19. A transmission gearing comprising a driving shaft, a driven shaft, a fixed member, a plurality of sets of actuating elements, each set having an element pivotally connected with the companion element of the same set, one end of an element in each set being pivotally connected with the driven shaft whereby the entire plurality of sets moves with the driven shaft, an eccentric movably mounted on the driving shaft and adapted to radially displace that element in each set which is connected with the driven shaft radially with respect to the driving shaft, means on another element of each set for engaging the fixed member successively at different points, and means on the outer end of the driving shaft for angularly displacing the same with respect to the eccentric and for simultaneously displacing angularly the eccentric near the inner end of the driving shaft relatively to the driving shaft.

20. A transmission gearing comprising a driving shaft, a driven shaft, a fixed circular member, a plurality of sets of actuating elements, each set having an element pivotally connected with the companion element of the same set, one element in each set being pivotally connected with the driven shaft, an eccentric circumferentially movable on the driving shaft and adapted to exert a pushing action radially of the driving shaft successively on each of those elements in each set which are pivotally connected with the driven shaft, means on another element in each set for pushingly acting on the circular fixed member, sleeves surrounding the driving shaft, one of said sleeves being fixed to the driving shaft and the other sleeve being connected with the eccentric, and means for angularly adjusting the position of said sleeves relatively to each other.

In witness whereof I affix my signature.

WALTER CHARLES PITTER.